United States Patent [19]
Ventrone et al.

[11] Patent Number: 5,564,042
[45] Date of Patent: Oct. 8, 1996

[54] ASYNCHRONOUS CLOCK SWITCHING BETWEEN FIRST AND SECOND CLOCKS BY EXTENDING PHASE OF CURRENT CLOCK AND SWITCHING AFTER A PREDETERMINED TIME AND APPROPRIATED TRANSITIONS

[75] Inventors: Sebastian T. Ventrone, Jericho; Timothy J. VonReyn, Huntingdon, both of Vt.

[73] Assignee: International Business Machines Corporation, Armonk, N.Y.

[21] Appl. No.: 191,446

[22] Filed: Feb. 3, 1994

Related U.S. Application Data

[63] Continuation of Ser. No. 751,473, Aug. 29, 1991, abandoned.

[51] Int. Cl.⁶ .................................................. G06F 1/04
[52] U.S. Cl. .................. 395/550; 364/270.5; 364/270.7; 364/270.8; 364/DIG. 1
[58] Field of Search .............................. 395/550; 327/99, 327/298

[56] References Cited

U.S. PATENT DOCUMENTS

| | | | |
|---|---|---|---|
| 4,398,155 | 8/1983 | Atwell, Jr. et al. | 328/73 |
| 4,870,299 | 9/1989 | Chen | 307/269 |
| 5,133,064 | 7/1992 | Hotta et al. | 395/550 |
| 5,155,840 | 10/1992 | Niijima | 395/550 |
| 5,197,126 | 3/1993 | Harrell | 395/200 |
| 5,231,636 | 7/1993 | Rasmussen | 370/100.1 |
| 5,309,561 | 5/1994 | Overhouse et al. | 395/200 |

Primary Examiner—Thomas C. Lee
Assistant Examiner—Sang Hui Kim
Attorney, Agent, or Firm—Eugene I. Shkurko

[57] ABSTRACT

A microprocessor having two on-board clock generators. The faster clock generator controls the microprocessor during normal, synchronous mode. The slower clock generator controls the microprocessor when the bus must be accessed, or during "snoop" mode which is invoked when another entry signals intent to use the bus.

A microprocessor having two on-board clock generators. The faster clock generator controls the microprocessor during normal, synchronous mode. The slower clock generator controls the microprocessor when the bus must be accessed, or during "snoop" mode which is invoked when another entity signals intent to use the bus.

11 Claims, 4 Drawing Sheets

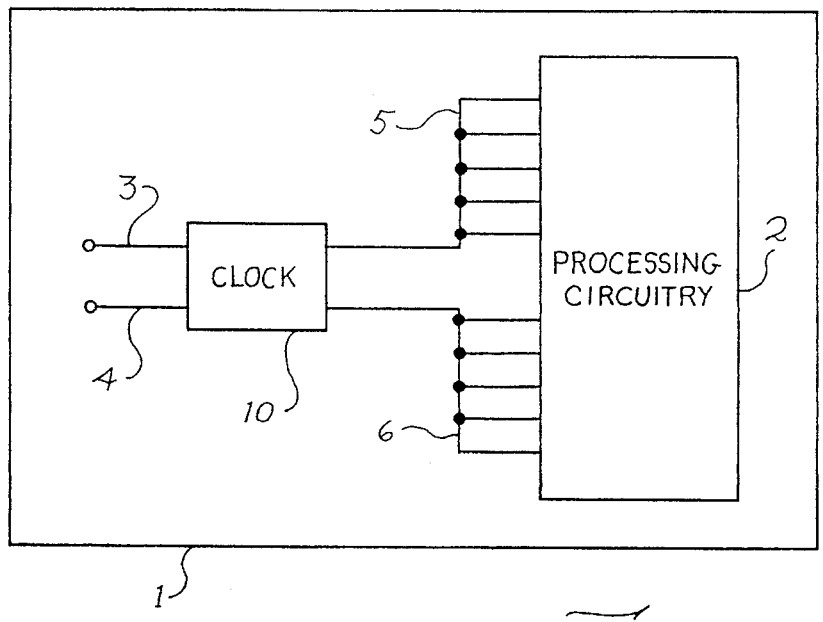
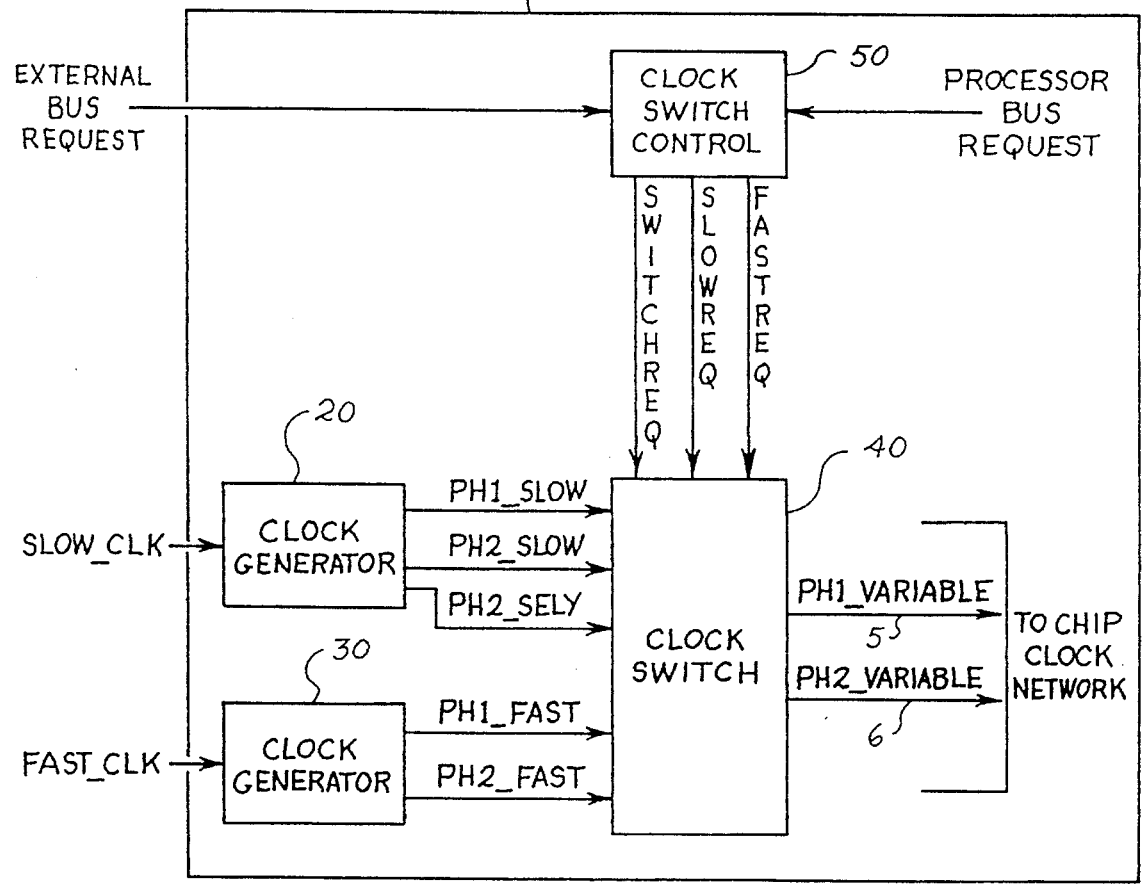

ASYNCHRONOUS CLOCK SWITCHING BETWEEN FIRST AND SECOND CLOCKS BY EXTENDING PHASE OF CURRENT CLOCK AND SWITCHING AFTER A PREDETERMINED TIME AND APPROPRIATED TRANSITIONS

This is a continuation of application Ser. No. 07/751,473 filed on Aug. 29, 1991, now abandoned.

BACKGROUND OF THE INVENTION

1. Field of the Invention

The present invention relates to microprocessors, and more particularly relates to an arrangement for clocking a microprocessor at two different, selectable rates.

2. Background Art

As the speed of semiconductor circuits continues to increase, the speed at which microprocessors are capable of operating has advanced. As a consequence, bus timings have become a critical performance limit of computer system performance. Due to Driver/Receiver delays, and the loading of the external busses, nigh speed bus traffic is difficult to obtain and often costly to implement.

Attempts have been made to resolve this problem and provide increased overall system performance. One approach involves the use of an asynchronous bus-to-processor operation. The processor is allowed to run at a faster internal speed, while the system operates at a slower bus speed. Whenever data is needed to be passed from the internal processor to the slower external system, a hand shaking mechanism is utilized. U.S. Pat. No. 4,807,109, entitled "High Speed Synchronous/Asynchronous Local Bus and Data Transfer Method," which issued to Farrell, et al., and was assigned to Intel Corporation, describes such a scheme. Another approach involves the use of an internal clock that runs at a multiple (2×, 3×, etc.) of the external clock.

Both of these approaches have limitations. The asynchronous clock with hand shake approach cannot be utilized to synchronize data from an internal processor to external devices if the processor has an on board cache. The processor would be unable to respond fast enough to keep up with the external busses whenever a bus snoop function was needed. A bus snoop occurs when the external system wants to use the external data bus. When this condition occurs the microprocessor must synchronize to the bus in order to determine if the operation to be performed is the change of a memory location that is in the cache. If this occurs, then the processor must invalidate that cache location. In order to use asynchronous clocking and accommodate this requirement, heretofore it has been necessary to add memory wait states to the system busses. However, these additional wait states are disadvantages in that they can reduce bus performance by 50% or more. In addition, such a hand shake would be required if the microprocessor needed to store data to memory using the bus, or the microprocessor required data that is not in cache (a cache miss), or the microprocessor needed to perform an I/O operation.

Regarding the second approach, limiting the clock speed of the microprocessor to only an integer multiple of the external system clock typically results in the requirement that the system clock be run at a significantly lower speed than it is capable, again adversely effecting overall system performance.

Thus, it is desired to have a solution to the aforementioned problem, permitting faster operation of the microprocessor with respect to the external bus clock, which would not impact the system performance, and yet would still allow the processor to operate at the appropriate speed when using the bus. The present invention provides just such a solution.

SUMMARY OF THE INVENTION

The present invention provides an integrated circuit microprocessor, operable in conjunction with at least one external bus for exchanging data between the microprocessor and circuitry external thereto, the bus being operable at a first clock rate. Processing circuitry is provided for processing digital data at a second clock rate or at the first clock rate, the second clock rate being faster than the first clock rate. First and second clock generators providing first and second clock signals at the first and second clock rates, respectively, are also provided. A switching arrangement is coupled to the first and second clock generators for sensing when the bus is to be used and for applying the first clock signals to the processing circuitry in response, and applying the second clock signals to the processing circuitry otherwise.

By implementing asynchronous clocking by clock switching, the processor can be run at a significantly faster rate than that of the bus, and overall system improved.

BRIEF DESCRIPTION OF THE DRAWINGS

FIG. 1 is a block diagram of a microprocessor chip, showing the relationship between the clock and processing circuitry portions thereof.

FIG. 2 is a high level block diagram showing the preferred embodiment of the present invention.

DETAILED DESCRIPTION OF THE PREFERRED EMBODIMENT

Figure 3:
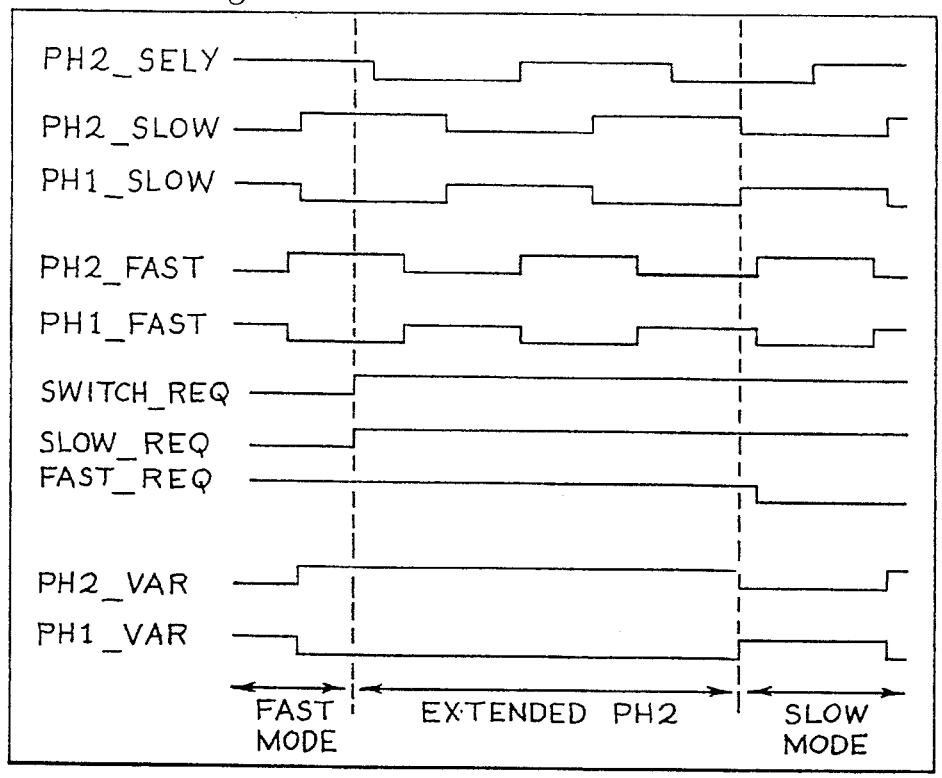
FIG. 3 is a timing diagram showing various waveforms in connection with a fast-to-slow mode transition during operation of the preferred embodiment of the present invention.

The preferred embodiment performs asynchronous operation by utilizing two on board clock generators. The first clock generator clocks the external bus. This generator operates at a slower, bus interface speed. The second clock generator is provided for a faster, internal clock speed. Two separate oscillator inputs are provided to drive these generators. Each clock generator generates two signals, 180 degrees shifted in phase, denominated PH1 and PH2, respectively. Thus, four signals are generated, a PH1_SLOW, a FH2_SLOW, a PH1_FAST, and a PH2_FAST. Whenever the internal processor is not performing an external cycle, then the processor is run with the faster clocks. However, the external busses and the internal state are monitored. Whenever an external bus cycle occurs, or the internal processor is to perform an external bus operation, the processor is switched to the slower clock. This switching is synchronized to ensure that no clock transition ambiguities or non simultaneities can occur. This causes the internal processor to be in sync with the external busses. Neither synchronization nor the passing of data from a slower external bus to a faster internal machine needs to be performed.

The preferred embodiment ensures that a zero wait state pipelined memory of the system can be maintained. When the external bus cycle is complete, then the processor is switched back to the faster clock signals. By implementing asynchronous clocking by clock switching versus handshaking, external bus performance is maintained while the ability to run the processor internally at a faster clock cycle is also maintained, resulting in a greater system performance.

GENERAL OVERVIEW

The preferred embodiment is implemented on a processor chip 1 as shown in FIG. 1.

The chip 1 includes processing circuitry 2, which is of conventional design, the details of which are well known and which are not important to an understanding of the invention. A clock 10 provides two sets of clock signals, 180 degrees shifted in phase, as mentioned above, on clock networks 5 and 6. The clock 10 is driven by two separate oscillators provided on input ports 3 and 4.

FIG. 2 is a high level block diagram of the clock 10 of FIG. 1. Clock generators 20, 30 transform the two external oscillator signals (SLOW_CLK and FAST_CLK) into two sets of orthogonal clocks (PH1_SLOW/PH2_SLOW and PH1_FAST/PH2_FAST, respectively). The term "SLOW" corresponds to the frequency at which the external, system bus (not shown) operates, whereas "FAST" corresponds to the faster frequency of processor operation while not involved in any system bus operations. The signal PH2_SELY occurs 90° earlier than PH2-SLOW, and is used by the clock switch to reduce the probability of a metastability problem when switching from fast to slow mode, as is described in more detail below. A clock switch 40 provides either the SLOW or FAST clock set to the chip clock network as the PHI_VAR/PH2_VAR signals. Finally, a clock switch controller 50 monitors external, system bus requests originating from either the processor or system devices to determine when the processor must be synchronous with the external bus. The clock switch controller 50 notifies the clock switch 40, using three control signals SWITCH_REQ, SLOW_REQ, and FAST_REQ, to either provide synchronous clocks PH1_SLOW/PH2_SLOW or asynchronous clocks PH1_FAST/PH2_FAST to the processor chip.

Transitions from one set of clocks to the other occur by extending the phase clock of the current mode, for example, FAST, from its falling edge to a subsequent falling edge of the same phase clock in the new mode, in this example, SLOW and then continuing to clock the chip with the clock pair of the new mode. This switching scheme is used in the preferred embodiment chosen to prevent a short or truncated clock pulse to the processor.

Operation of the Clock Switch Logic Circuit

This section describes, in detail, the operation of the clock switch 40, a key component of the preferred embodiment. Please refer to the clock switch block diagram, FIG. 5, and the transition timing diagrams FIGS. 3 and 4, for the following discussion. References to signal names are capitalized in the text that follows.

Figure 4:
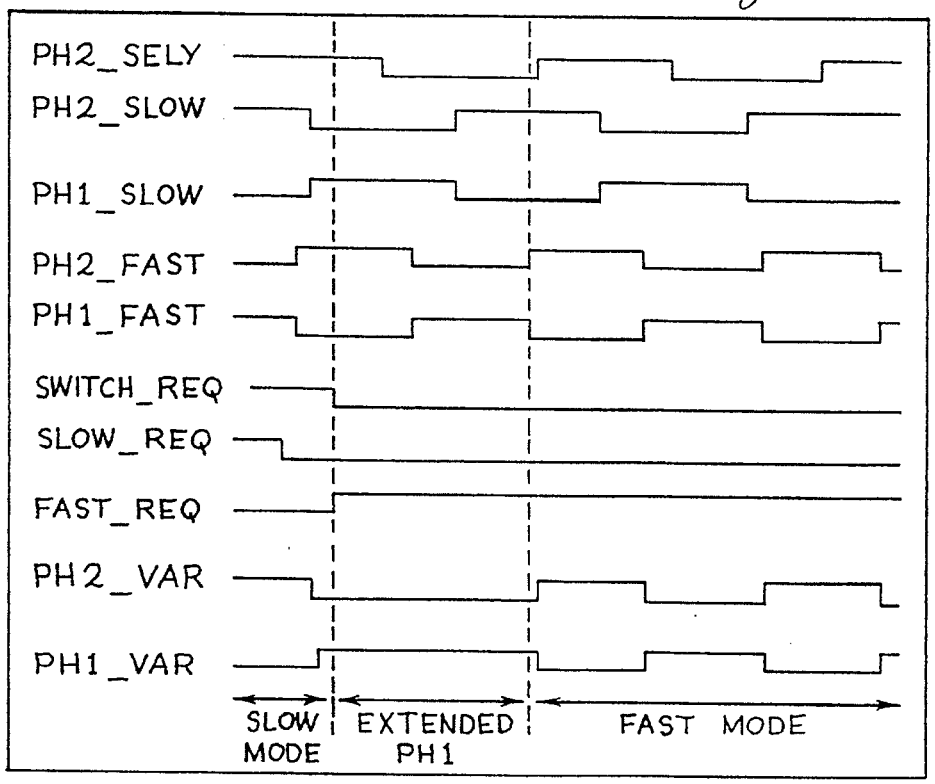
FIG. 4 is a timing diagram snowing a various waveforms in connection with a slow-to-fast mode transition during operation of the preferred embodiment of the present invention.

Transitions for one pair of PH1/PH2 clocks to the other is performed by the PH1 Clock Mux 401 and PH2 Clock Mux 402. These muxes select either the FAST PH1/PH2 clock pair, PH1_FAST and PH2_FAST, the SLOW PH1/PH2 clock pair, PH1_SLOW and PH2_SLOW or fixed high (1) or low (0) signals. The fixed high or low signals are used to hold the PH1_VAR and PH2_VAR clock signals PHI_VAR and PH2_VAR at fixed levels, i.e. extend them while waiting, for example, for a subsequent PH1_FAST to occur aster a PH1_SLOW clock pulse when switching from slow clocks to fast clocks, as shown in FIG. 4. SWITCH_REQ, which is a request to switch clock modes (from fast to slow or slow to fast), controls the Clock Muxes 401, 402, to select the appropriate fixed level. A transition on the CLKSEL signal completes the transition to the new clock mode by moving the input port selected by the Clock Muxes 401, 402, from a fixed level to the new clock mode PH1/PH2 pair at the appropriate time.

When a fast to slow transition is requested, indicated by SWITCH_REQ and SLOW_REQ set to "1" during PH2_VAR, the clock switch 40 extends PH2_VAR from the current PH2_FAST clock to a subsequent PH2_SLOW by means of selecting the input port sequence 0-2-3 of the PH2 Clock Mux 402. The switch from input port 0 to 2 occurs during the PH2_FAST when SWITCH_REQ is set to a "1". This is the extension of PH2_VAR just mentioned. The switch from port 2 to 3 occurs during the PH2_SLOW which occurs after 1) the PH2_FAST in which SLOW_REQ was asserted, and 2) a phase delayed PH2_SLOW signal, PH2_SELY, which occurs aster the PH2_FAST cycle in which SLOW_REQ was asserted. The purpose of waiting for PH2_SELY after FH2_FAST and before a subsequent PH2_SLOW is to reduce the probability of generating a metastable CLKSEL signal. The logic implementing this metastable precaution is included in the Slow Select Control Logic 403, shown in FIG. 6.

Figure 5:
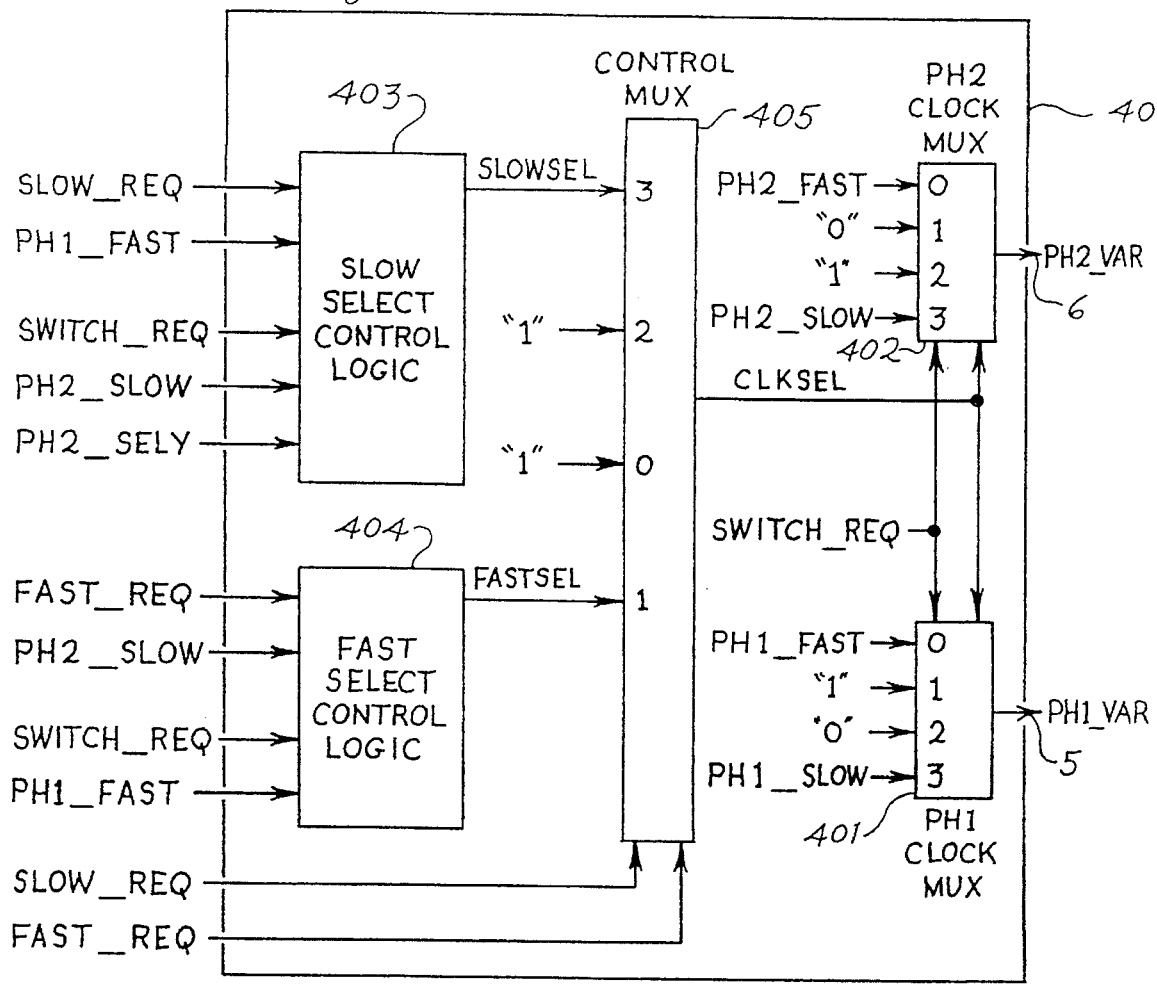
FIG. 5 is a block diagram of the clock switch of the preferred embodiment of the present invention.
Figure 6:
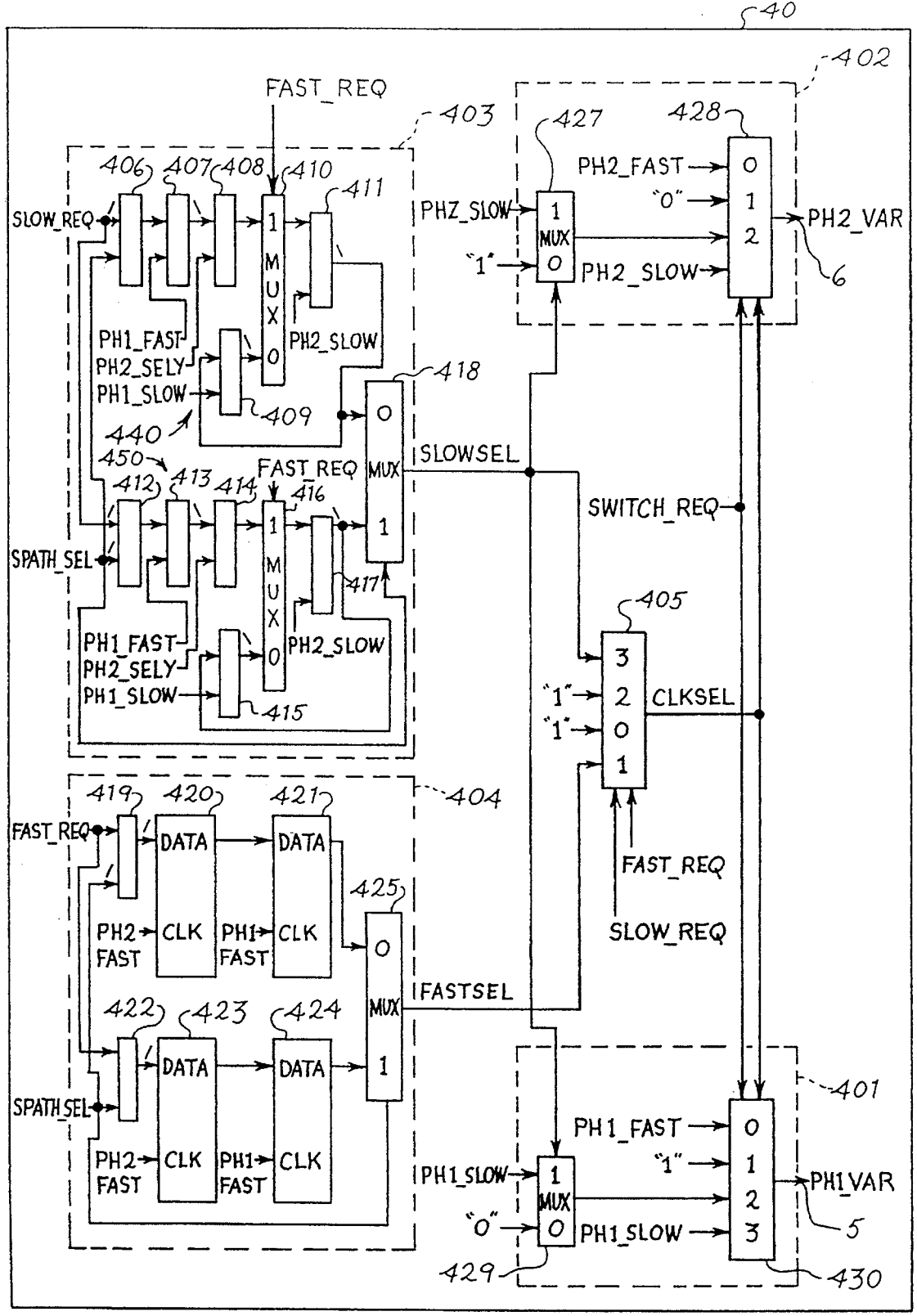
FIG. 6 is a logic diagram of the clock switch shown in FIG. 5.

In FIG. 6 the logic elements are as follows. Device 406 is a NORgate. Devices 407, 408 and 409 are latches. Device 410 is a multiplexer. Device 411 is a latch. Device 412 is a NORgate. Devices 413, 414 and 415 are latches. Device 416 is a multiplexer. Device 417 is a latch. Device 418 is a multiplexer. Device 419 is an ANDgate. Devices 420 and 421 are latches. Device 422 is an ANDgate. Devices 423 and 424 are latches. Device 425 is a multiplexer. Devices 427, 428, 429 and 430 are latches. Finally, Device 405 is a multiplexer. Note that, as in FIG. 5, Element 402 is the phase 2 clock multiplexer, Element 401 is the phase 1 clock multiplexer, Element 403 is the slow select control logic, Element 404 is the fast select control logic and Element 405 is the control multiplexer. Note that a slash (/) appearing at the input of a logic element in the figures denotes that the complement of the signal line applied to that input is provided as that input.

Figure 7:
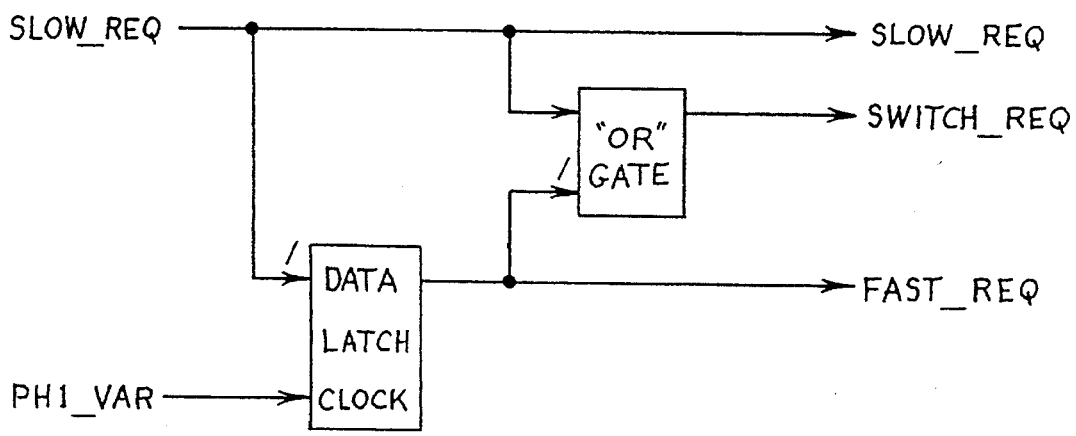
FIG. 7 is a block diagram of a portion of the circuitry of the preferred embodiment showing the relationship between certain signals therein.

The logic controlling this final switch is Slow Select Control Logic 403, shown generally in FIG. 5, and shown in detail in FIG. 6. Logic 403 generates the switch control signal, SLOWSEL, which in turn becomes CLKSEL as SLOW_REQ and FAST_REQ are both (1) thus selecting port 3 of the Control Mux 405. See FIG. 7 for the relationship between SLOW_REQ and FAST_REQ. The timing diagram of FIG. 3 illustrates a fast to slow transition.

A slow to fast transition request is identified by SLOW_REQ set to "0" in PH2_VAR preceding transition request and FAST_REQ set to "1" and SWITCH_REQ set to "0" on FH1_VAR in which the transition is requested. The request occurs in a similar fashion to the fast to slow transition described above. The difference is that on a slow to fast transition, PH1_VAR is extended and the Clock Mux 401, 402, port selection sequence is 3-1-0 during this extended PH1_VAR. Also, the metastability problem is addressed here by requiring that a PH2_FAST clock occur before switching from ports 1 to 0 during a PH1_FAST. See FIG. 6. The timing diagram of FIG. 4 illustrates a fast to slow transition.

Note that FAST to SLOW transitions result in an extended PH2_VAR signal while SLOW to FAST transitions result in an extended PH1_VAR signal. This implementation was specifically required for an actual microprocessor for which it was designed, but could be readily modified by those of ordinary skill in the art for other designs.

There is additional logic in the clock switch 40 to prevent clock glitches. The parallel logic in the Slow Select Control Logic 403 and Fast Select Control Logic 404, shown in FIG. 6, which are basically single bit counters, and their corresponding enable signals SPATH_SEL and FPATH_SEL, are used to guarantee that when the control mux switches to a different input port, that input port initially will have the same value as the previously selected input port, thus preventing CLKSEL and therefore PH1_VAR and FM2$_{13}$ VAR from containing glitches. For example, one of the parallel legs 440, 450, in the Slow Select Control Logic 403 (see FIG. 6) will be initialized to select the fast clocks so when switch from fast mode to slow mode is requested, a smooth transition will occur.

Another potential source of clock glitches are the signals SWITCH_REQ and SLOW_REQ because they may glitch during PH2_VAR. TO prevent clock glitches it is required that they settle before the end of PH2_VAR. Analysis of this problem is simplified by considering the case when FAST_REQ a "0" and the case when FAST_REQ is a "1".

When FAST_REQ is a "0" i.e., the chip is in slow mode, SWITCH_REQ cannot glitch during PH2_VAR (see FIG. 6). Hence, the Clock Mux 401, 402, control lines are a function of CLKSEL only as SWITCH_REQ is a fully transitional, steady "1". Note that the Control Mux 405 inputs may be switching between 0 and 2 if SLOWREQ glitches during PH2_VAR but this means CLKSEL is a steady "1". Therefore the clock mux controls are stable at 5 (slow clocks selected), and therefore the PH1_VAR and PH2_VAR clock signals are likewise stable.

When FAST_REQ is a "1", i.e., chip is in fast mode, and SLOW_REQ glitches during PH2_FAST, then SWITCH_REQ may also vary between "0" and "1". The Control Mux 405 controls will be switching between 1 and 3 and so CLKSEL will either be equal to SLOWSEL or FASTSEL, respectively. However, because the chip is currently in fast mode, FAST_SEL is "0" and SLOW_SEL is "0" at least until the PH1_FAST following the PH2_FAST in which SLOW_REQ is glitching. Thus the Clock Mux 401, 402, controls will be switching between 2 and 0 during PH2_FAST and this is acceptable because PH2_VAR will then be a steady "1" during PH2_FAST. At the end of PH2_FAST, SWITCH_REQ will have settled (this was a requirement started earlier) and then the Clock Switch 40 will either switch to slow mode, if SLOW_REQ is a "1", or remain in fast mode, if SLOW_REQ is a "0". Therefore, there are no clock glitches occurring when FAST_REQ is a "1" and SLOW_SEL and SWITCH_REQ are glitching during PH2_VAR.

While the invention has been described above with reference to the preferred embodiment thereof, it will be readily apparent to those of ordinary skill in the art that various adaptations and modifications can be made without departing from the scope of the invention as defined in the appended claims.

What is claimed is:

1. A semiconductor chip having a microprocessor thereon that is operable in at least one mode in conjunction with at least one bus for exchange of data between said microprocessor circuit and circuitry external thereto, and being clocked by a clock signal generated on said semiconductor chip that switches between a first and a second state, said bus being operable at a first clock rate, comprising:

a) processing circuitry for processing digital data, operable at said second clock rate or at said first clock rate, said second clock rate being faster than said first clock rate;

b) first clock means for providing a first clock signal at said first clock rate;

c) second clock means for providing a second clock signal, asynchronous to said first clock signal at said second clock rate; and d) clock switch means coupled to said first and said second clock means for sensing when said bus is to be used and for applying said first clock signal to said processing circuitry otherwise, said clock switch means including:

c1) means, responsive to only the first and second clock rates, for determining a time at which to change the clock signal applied to said processing circuitry from said first clock signal to said second clock signal, c2) means for sensing, at said determined time, the first clock signal then being applied to said processing circuitry, and for applying the second clock signal to said processing circuitry at the next transition of said second clock signal to the alternate state of that sensed at said determined time, but only after said first clock signal has made a transition, after said determined time, from the sensed state to said alternate state;

c3) means, responsive to only the first and second clock rates, for determining a time at which to change the clock signal applied to said processing circuitry from said second clock signal to said first clock signal, and c4) means for sensing, at said determined time, the second clock signal then being applied to said processing circuitry, and for applying the first clock signal to said processing circuitry at a transition just after the next transition of said first clock signal to the alternate state of that sensed at said determined time, but only after said second clock signal has made a transition, after said determined time, from the sensed state to said alternate state.

2. A circuit according to claim 1, wherein said processor is clocked by at least two clock signals having the same frequency but different phase with respect to one another by a predetermined phase difference, wherein:

a) said first clock means and said second clock means provide said first clock signal and said second clock signal, respectively, each as two applied clock signals differing in phase by said predetermined phase difference; and b) said clock switch means comprises means for simultaneously controlling the transition between said first clock signal and said second clock signal for each of the applied clock signals related respectively to said first and said second clock signals.

3. An integrated circuit chip, comprising:

a) a fast and slow clock, where the fast clock is faster than and asynchronous to the slow clock;

b) a functional circuit block, deigned to be clocked by said fast clock when performing internal processing, and designed to be clocked by said slow clock when doing external processing of signals going to and from the function circuit block; and c) means for switching the functional circuit block from the slow clock to the fast clock at a very next available transition of the fast clock: and from the fast clock to the slow clock in at most two transitions of the slow clock: each without a third clock coordinating the switching.

4. The integrated circuit chip of claim 3, wherein the functional circuit block is a portion of a microprocessor.

5. The integrated circuit chip of claim 3, wherein the functional circuit block is a microprocessor.

6. An integrated circuit chip, comprising:

a) a fast and slow clock, where the fast clock is faster than and asynchronous to the slow clock;

b) a functional circuit block designed to be clocked by said fast clock when performing internal processing, and designed to be clocked by said slow clock when interfacing with signals from outside the functional circuit block thus performing external processing; and c) means for switching the functional circuit block operation from the slow clock to the fast clock at a very next transition of the fast clock, and from the fast clock to the slow clock in at most two transitions of the slow clock, wherein the switching is activated by a switching request received by the switching means and the switching is completed only in response to the fast and the slow clocks, wherein said switching means providing for faster asynchronous clock switching between the internal and the external processing and for being self timed.

7. The integrated circuit chip of claim 6, wherein the switching means operates only in response to the fast and slow clock, and wherein the functional circuit block is a portion of a microprocessor.

8. The integrated circuit chip of claim 6, wherein the switching means operates only in response to the fast and slow clock, and wherein the functional circuit block is a microprocessor.

9. An integrated circuit chip comprising:

a) a fast and slow clock, where the fast clock is faster than and asynchronous to the slow clock, and the fast clock is a fractional proportion difference from the slow clock;

b) a functional circuit block designed to be clocked by said fast clock when performing internal processing, and designed to be clocked by said slow clock when exchanging signals from outside the functional circuit block thus performing external processing; and c) means for switching the functional circuit block operation from the slow clock to the fast clock within one fast clock cycle to enable internal processing, and from the fast clock to the slow clock within two slow clock cycles to enable external processing, wherein the switching means is initiated by receiving a switching request and is completed either by the end of the fast clock concluding a first full clock cycle to perform internal processing, or by the end of the slow clock concluding a first full clock cycle to perform external processing.

10. The integrated circuit chip of claim 9, wherein the switching means operates only in response to the fast and slow clock, and the functional circuit block is a portion of a microprocessor.

11. The integrated circuit chip of claim 9, wherein the switching means operates only in response to the fast and slow clock, and the functional circuit block is a microprocessor.

* * * * *